United States Patent
SanGiovanni et al.

(10) Patent No.: US 8,819,570 B2
(45) Date of Patent: Aug. 26, 2014

(54) SYSTEMS, METHODS, AND COMPUTER PROGRAM PRODUCTS DISPLAYING INTERACTIVE ELEMENTS ON A CANVAS

(75) Inventors: John SanGiovanni, Seattle, WA (US); Benjamin Bederson, Chevy Chase, MD (US)

(73) Assignee: Zumobi, Inc, Seattle, WA (US)

(*) Notice: Subject to any disclaimer, the term of this patent is extended or adjusted under 35 U.S.C. 154(b) by 559 days.

(21) Appl. No.: 12/412,854

(22) Filed: Mar. 27, 2009

(65) Prior Publication Data
US 2010/0251153 A1   Sep. 30, 2010

(51) Int. Cl.
*G06F 3/048* (2013.01)
*G06F 3/0488* (2013.01)
*G06F 3/0481* (2013.01)

(52) U.S. Cl.
CPC .......... *G06F 3/04886* (2013.01); *G06F 3/0488* (2013.01); *G06F 3/04817* (2013.01)
USPC ............ 715/767; 715/784; 715/848; 715/768

(58) Field of Classification Search
USPC ....................................... 715/764
See application file for complete search history.

(56) References Cited

U.S. PATENT DOCUMENTS

| | | | |
|---|---|---|---|
| 5,760,774 A * | 6/1998 | Grossman et al. | 715/835 |
| 6,765,571 B2 | 7/2004 | Sowizral et al. | |
| 7,479,949 B2 * | 1/2009 | Jobs et al. | 345/173 |
| 2003/0037322 A1 * | 2/2003 | Kodosky et al. | 717/162 |
| 2003/0184587 A1 * | 10/2003 | Ording et al. | 345/769 |
| 2004/0090462 A1 * | 5/2004 | Graham | 345/767 |
| 2005/0140694 A1 | 6/2005 | Subramanian et al. | |
| 2006/0129933 A1 | 6/2006 | Land et al. | |
| 2007/0011622 A1 * | 1/2007 | Chae et al. | 715/764 |

OTHER PUBLICATIONS

A Review and Taxonomy of Distortion-Oriented Presentation Techniques Y. K. Leung Published Jun. 1994.*
Hinkley, K. et al., "Stitching: Pen Gestures that Span Multiple Displays," AVI '04, Gallipoli (Lecce), Italy, May 25-28, 2004, 9 pages, ACM.
Rekimoto, J., "Pick-and-Drop: A Direct Manipulation Technique for Multiple Computer Environments," UIST 97, Banff, Alberta, Canada, pp. 31-39, ACM.
Streitz, N., et al., "Roomware®—The Second Generation," CHI 2002, Apr. 20-25, 2002, Minneapolis, Minnesota, pp. 506-507, ACM.
Fails, J.A., Mobile Collaboration for Young Children, IDS 2007 Proceedings: Doctoral Consortium, Jun. 6-8, 2007, Aalborg, Denmark, pp. 181-184, ACM.
International Search Report and the Written Opinion issued for PCT/US2010/026475, dated Apr. 15, 2010, 8 pages.

* cited by examiner

*Primary Examiner* — Peiyong Weng
(74) *Attorney, Agent, or Firm* — Fulbright & Jaworski LLP

(57) ABSTRACT

A computer program product having a computer readable medium having computer program logic recorded thereon comprises code for generating a canvas upon a display space, the canvas being larger than the display space and including an interactive element, code for navigating within the canvas upon the display space code for changing a status of the interactive element in response to navigation moving the interactive element within the display space.

31 Claims, 8 Drawing Sheets

SYSTEMS, METHODS, AND COMPUTER PROGRAM PRODUCTS DISPLAYING INTERACTIVE ELEMENTS ON A CANVAS

TECHNICAL FIELD

The present description is generally related to graphical user interfaces and is related, more specifically, to rendering interactive items within a large canvas.

BACKGROUND

Graphical User Interfaces (GUIs) are currently widespread and are recognized by consumers in, e.g., Apple™ and Microsoft™ products. GUIs typically include one or more items, such as icons or tiles, that can be selected by a user. Many GUIs show documents that are larger than the screen, for example, a web browser that shows a news page with a scroll bar on the side to let the user scroll up or down to access all of the content thereon. Another example is the home screen on an Apple iPhone™ that shows icons representing applications. When there are more than sixteen icons, the canvas of the home screen becomes larger than the device screen, and the user can scroll to access any of the icons.

The degree of interaction in GUIs becomes greater as GUIs become more advanced. For instance, in the Microsoft Word™ 2007 word processor, there is a concept where an interactive element becomes visible in direct response to a user action. Specifically, there is a feature that allows a user to select text, and when the user moves the cursor near the selected text a toolbar becomes visible and when the user moves the cursor away, the toolbar disappears.

The introduction of touch screens has changed the way some consumers see GUIs, and increasingly sophisticated applications and GUIs are being created for touchscreen devices. However, whether or not in the context of touchscreens, prior art techniques for navigating around a display space, e.g., scrolling, are not optimally elegant or engaging.

BRIEF SUMMARY

Various embodiments of the invention are directed to systems, methods, and computer program products that change a status of an interactive element in response to navigation bringing the interactive element into a display space. In one example, a handheld processor-based device is executing an application that renders a large canvas upon its screen. In this example, the canvas is larger than the display space of the screen so that only a portion of the canvas is shown at a given time when the canvas is rendered at full size. Navigation by the user translates the canvas up/down/right/left with respect to the screen, and navigation can be accomplished by, e.g., moving a scroll bar, sliding on a touch screen, etc. Navigation moves some interactive elements onto the screen while moving other interactive elements off of the screen. As an interactive element moves onto the screen and toward the center of the display space, the interactive element becomes selectable, and the change in selectability is accompanied by one or more visual transforms that indicate the change to the user. Further, in this example, an interactive element becomes gradually more opaque as it becomes selectable. Likewise, the element becomes less opaque (fades out) as it moves away from the center of the display space.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
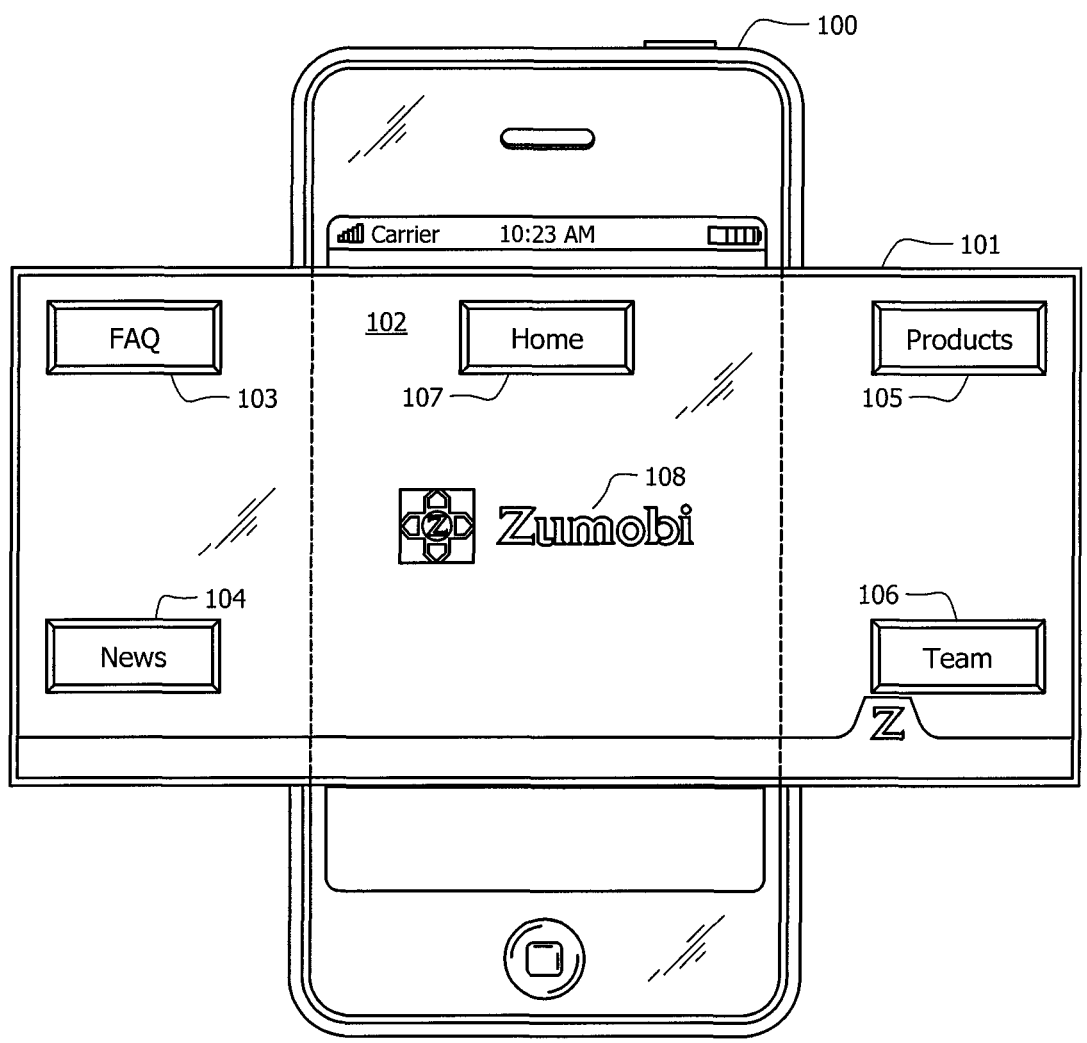
FIG. 1 is an illustration of an exemplary handheld device displaying a canvas according to one embodiment of the invention.

FIG. 1 is an illustration of an exemplary handheld device 100 displaying canvas 101 according to one embodiment of the invention. Handheld device 100 displays canvas 101 upon screen 102 (delineated by dotted lines). It is only possible for a portion of canvas 101 to be rendered upon the display space of screen 102 at any given time (at least when canvas 101 is at full size). Thus, it is appropriate to describe canvas 101 as being larger than the display space of screen 102. Canvas 101 includes five interactive elements 103-107, which in this example, are shown as icons, but can include any kind of interactive element such as a tile or a control feature. Canvas 101 also includes non-interactive logo 108. As used in this example, the term, "canvas" refers to an area on which interactive elements and/or non-interactive elements are placed, and it refers to the entire virtual display area whether or not the entire virtual display area is displayed on a screen at a given time.

As shown in the following figures, navigation is performed when a user moves canvas 101 relative to the display space to change which portion of canvas 101 is shown within the display space. Navigation often includes bringing one or more interactive elements into the display space or moving one or more interactive elements out of the display space. A user of device 100 performs navigation, for example, by sliding a finger on the surface of screen 102 (which is touch sensitive) to move canvas 101, though other embodiments can employ any method now known or later-developed including, e.g., use of scroll buttons or mapped keys. The embodiment of FIG. 1 changes a status of an interactive element in response to navigation bringing the interactive element toward or away from the center of the display space. Thus, as shown in FIG. 1, element 107 is active because it is at or near the center of the display space, while elements 103-106 are inactive.

Figure 2:
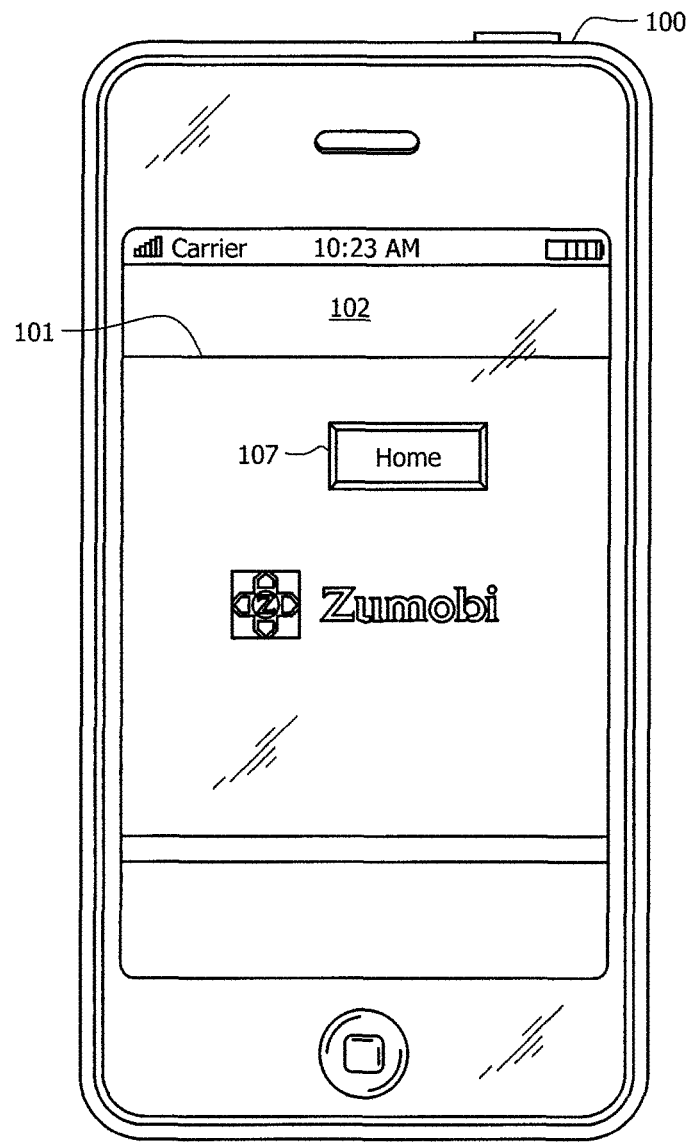
FIG. 2 is an illustration of an exemplary handheld device and canvas, showing one view of how the canvas would be rendered upon the device.

FIG. 2 is an illustration of handheld device 100 and canvas 101, showing one view of how canvas 101 would be rendered upon device 100. In this example, for fullness of illustration, the display space of screen 102 is smaller than screen 102. It should be noted that some embodiments may have a display space the same size or smaller than a given screen and that various embodiments are not limited to any particular display space or screen size. In FIG. 2, interactive element 107 is near the center of the display space and fully selectable which in this example is indicated by full opacity.

Figure 3:
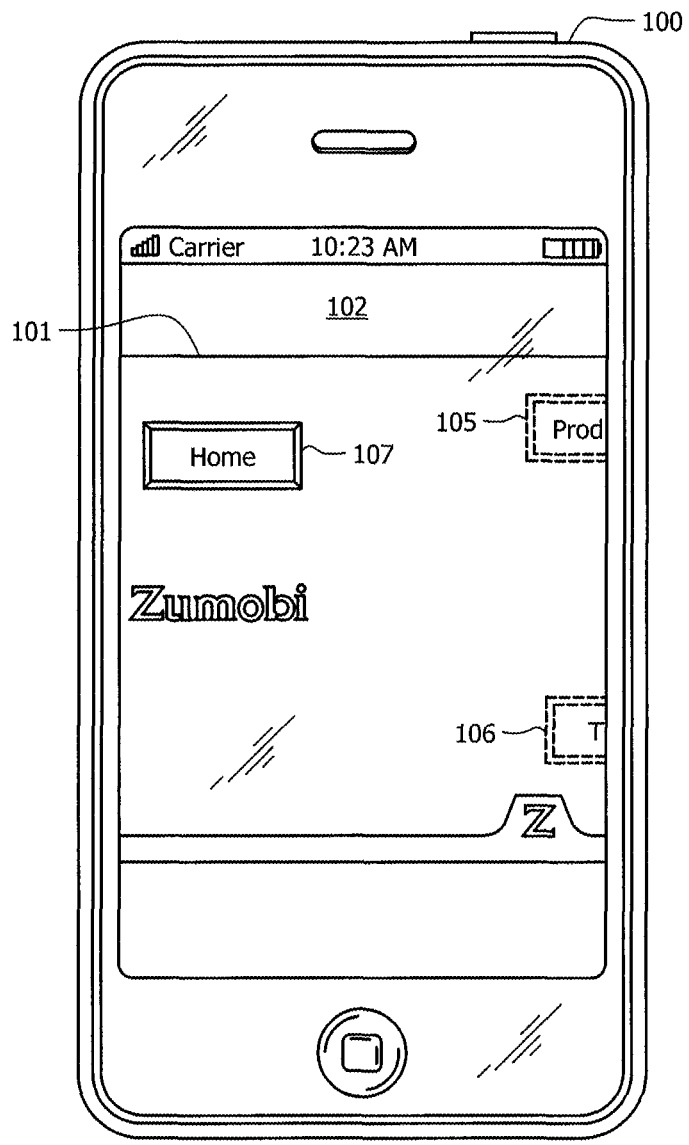
FIG. 3 is an illustration of an exemplary handheld device and canvas, showing another view of how the canvas would be rendered upon the device.

FIG. 3 is an illustration of handheld device 100 and canvas 101, showing another view of how canvas 101 would be rendered upon device 100. Specifically, FIG. 3 shows canvas 101 shifted to the left relative to the display space and relative to the display of FIG. 1. Icon 107 is still shown as fully selectable, as it was in FIG. 1, which in this example is indicated by full opacity. Icons 105 and 106 are just entering the display space from the right and are not fully selectable, which is indicated in this example by less than full opacity.

Figure 4:
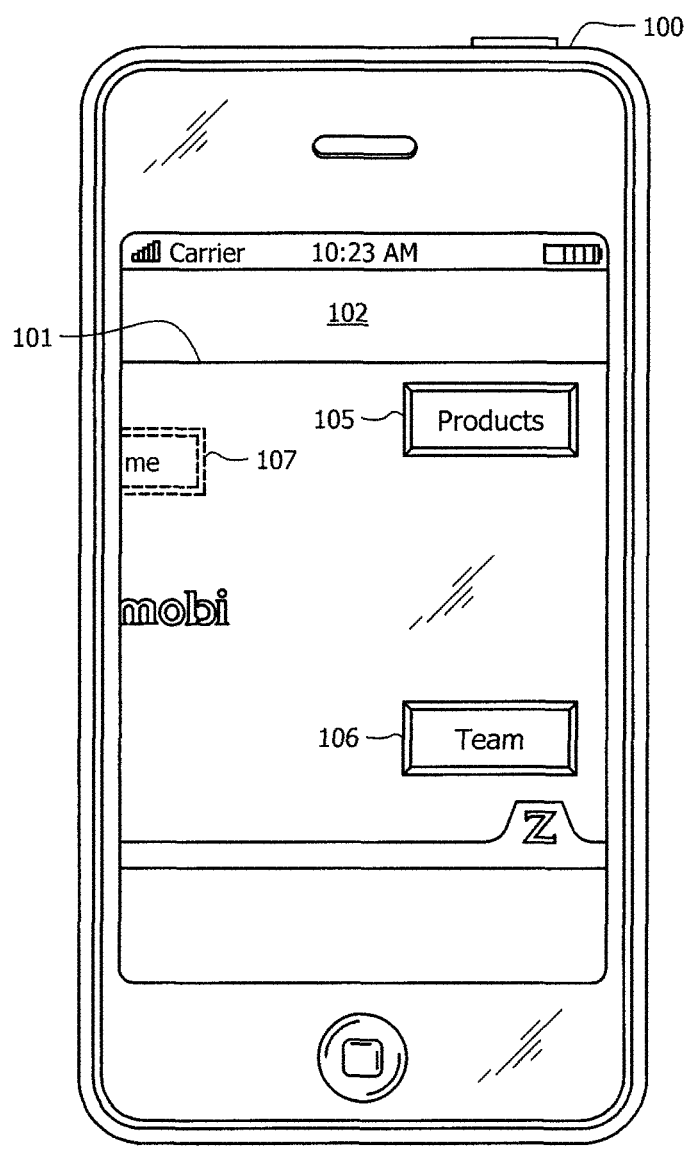
FIG. 4 is yet another illustration of the exemplary handheld device and canvas, showing one view of how the canvas would be rendered upon the device.

FIG. 4 is yet another illustration of handheld device 100 and canvas 101, showing one view of how canvas 101 would be rendered upon device 100. In FIG. 4, canvas 101 is shifted all the way to the left relative to the display space, thereby bringing icons 105 and 106 near to the display space center (at least in a horizontal sense). As shown, icons 105 and 106 are at or near full opacity, indicating that they are fully selectable. Icon 107, which was fully selectable in FIGS. 2 and 3, is now unselectable, as indicated by substantially less opacity.

A feature of note in this example is that an interactive element is not necessarily selectable (and/or active in the case of a tile) just because all or a portion of it is within the display space. Instead, an interactive element becomes fully selectable or active as it moves toward the display space center. Requisite proximity to the display space center (or other display space location, for that matter) can vary among embodiments, so that some embodiments may keep an interactive element selectable until it is far to the side or even partially off of the display space.

The embodiment of FIGS. 2-4 changes a status (in this case, selectability) of an interactive element as navigation within canvas 101 brings the interactive element into view. While difficult to show in figures only, the change in status can be indicated by one or more visual transformations on the interactive elements affected. For example, gradual increases or decreases in opacity can be used to indicate whether an interactive item is selectable. That is, as an interactive element is moved into view and toward the center of the display space, it can become gradually more opaque until it is fully opaque to indicate that it is selectable. Then, as navigation moves the interactive element away from the center of the display space, and eventually off the display space, it can become increasingly transparent. Any of a variety of visual transformations can be performed, such as zooming and/or resizing, rotation, three-dimensional visual effects, color effects, flashing, and the like. In fact, any appropriate visual transform can be used by various embodiments of the invention, and sound effects can be even be used as well.

In another embodiment, a canvas includes one or more tiles, where tiles are similar to icons but can be more robust. As used in this example, the term, "tile" refers to a small collection of control features that work together. Some tiles feature changing graphics or even show content from an underlying application, e.g., an address book page or a map last accessed by the application, current time/temperature, and the like. As a tile is brought into the display space and moves toward the display space center, the mobile device can change an active status of the tile by, for example, updating time/temperature or changing from a generic view of the tile to a real-time active view. Also, as the tile moves toward the center (or other designated location), more features within the tile may appear or become active. For example, a tile near the edge may display only time, while that same tile, as it moves toward the center, may display additional information, such as temperature or time in different locations. In some embodiments, the size of the tile might be increased to accommodate the additional information. Control features, such as buttons, text boxes, and the like, can also be included in a canvas and treated in a manner similar to icons and tiles. That is, one or more statuses of a control feature can be changed in response to navigation. As used in this example, the term, "control feature" refers to a single User Interface (UI) component. Additional visual transforms such as rotation, resizing and color effects, may also be applied to tiles and control features. While the examples above specifically mention icons, tiles, and control features, various embodiments contemplate use with any kind of interactive element now known or later developed.

Figure 5:
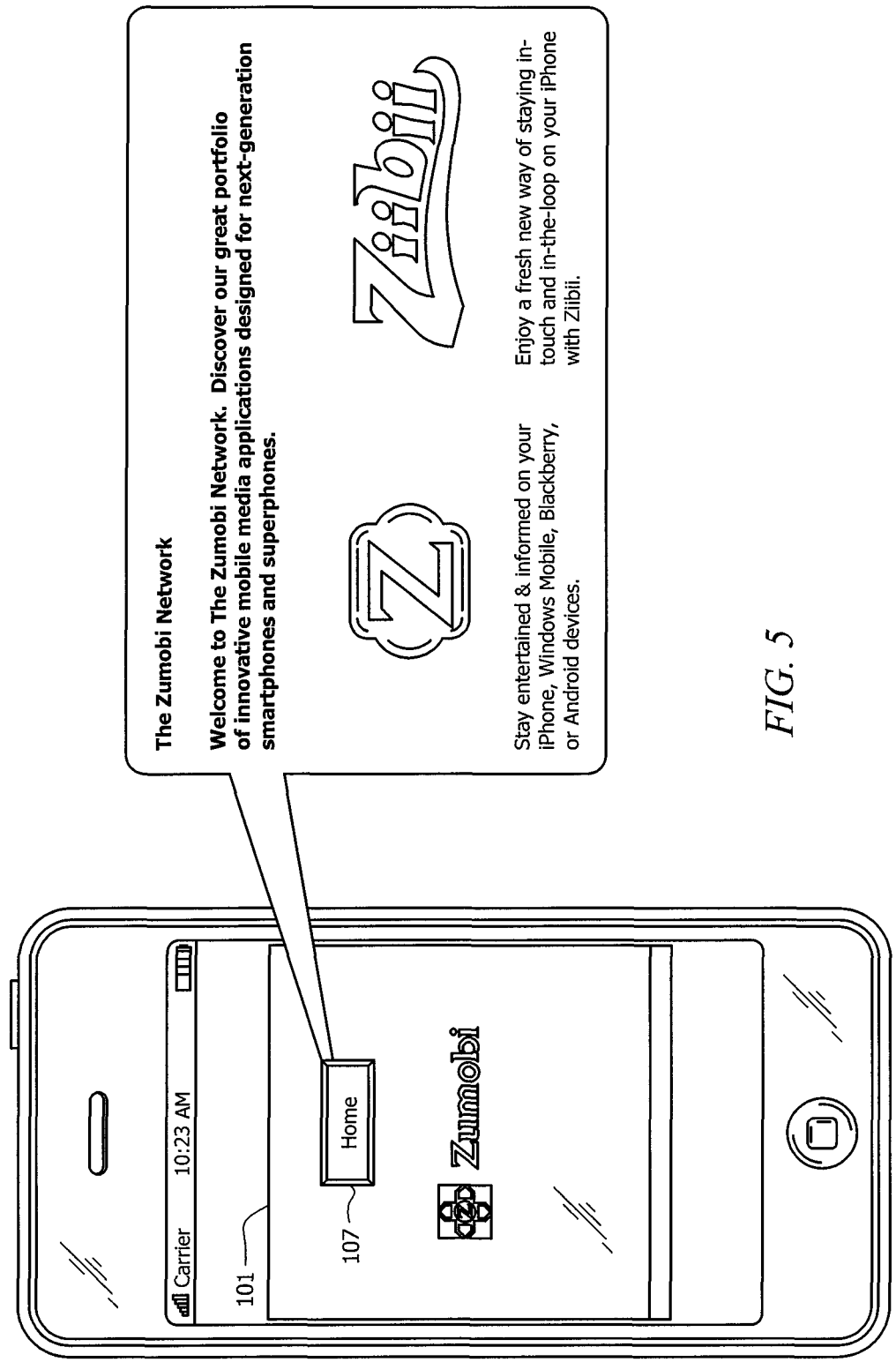
FIG. 5 is an illustration of an exemplary embodiment that includes selecting an underlying application in response to navigation.

FIGS. 2-4 show an embodiment wherein an interactive element becomes selectable in response to navigation. Additionally or alternatively, some embodiments include selecting an underlying application in response to navigation. An example of such an embodiment is shown in FIG. 5, where interactive element 107 is moved toward the center of the display space and is automatically selected in response to the navigation so that its underlying link is loaded and displayed. Subsequent navigation operates to return to canvas 101, which shows interactive element 107 as an icon or tile once again. Various embodiments can select other types of interactive elements, such as by launching an application or performing a control function.

The embodiments described above are operable on a touch-screen interface, but other embodiments are not so limited. For instance, other embodiments are operable on keypad devices (by, e.g., mapping items to keys and/or employing a moveable cursor) and mouse/touchpad/roller ball-enabled devices, and the like. Furthermore, other embodiments are operable on devices other than handheld devices. For instance, other embodiments can be used on desktop and laptop computers, multi-user mural-type screens, and the like. Additionally, effects can be added to the canvas, as well. For instance, the canvas can be made to appear as a three-dimensional surface (e.g., the outside surface of a cylinder) so that navigation feels like more than mere right-left/up-down manipulation.

Figure 6:
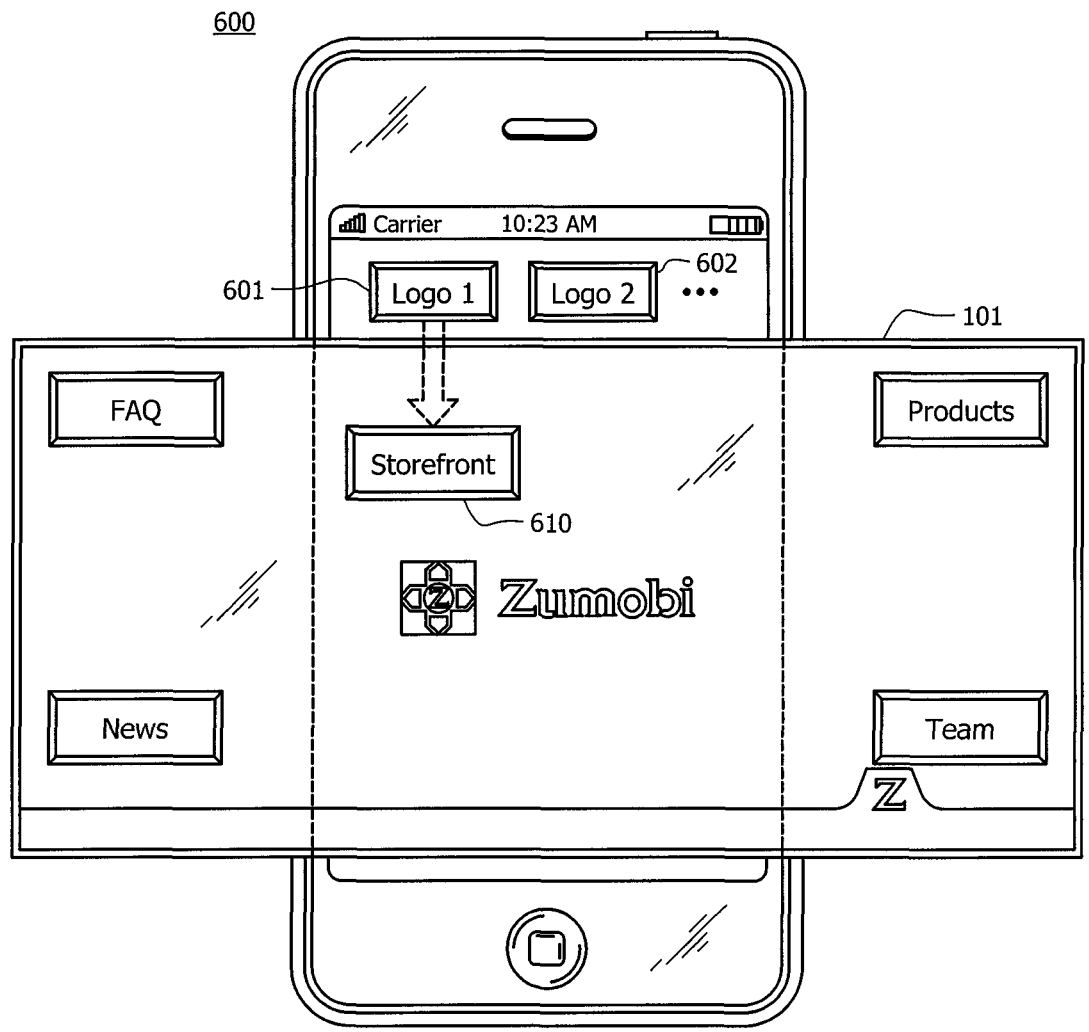
FIG. 6 is an illustration of an exemplary system adapted according to one embodiment of the invention.

FIG. 6 is an illustration of exemplary system 600 adapted according to one embodiment of the invention. System 600 includes canvas 101 (as in the embodiments above) and adds a bank of interactive elements with interactive elements 601 and 602. Ellipses are shown in the bank of interactive elements to indicate that the number of interactive elements therein is scalable and can, itself, be larger than the available display space.

System 600 includes an edit feature that lets a user drag interactive elements from the top of the display space into canvas 101 so that the user can make his or her own canvas in real time as he or she is using it. In one example, canvas 101 is included in a shopping application and interactive elements 601 and 602 include company logos across the top of the screen. The user uses the touchscreen (or other interface device in other embodiments) to grab the logos and pull them down into canvas 101. Each logo placed in canvas 101 enlarges to become a storefront, as exemplified by interactive element 601 and interactive element 610 (a storefront). The more logos a user adds to canvas 101, the larger canvas 101 becomes, in some cases exceeding the size of the display space. Canvas 101 works in the same way as the examples above in FIGS. 2-5 by changing statuses of the interactive elements in canvas 101 based upon navigation. Thus, as a user navigates to bring a storefront near the center of the display space, the storefront becomes active and may also undergo a visual transformation, and as a user navigates to move a storefront away from the center of the display space, the storefront may become inactive and undergo a visual transformation, such as becoming similar to logo 601.

Figure 7:
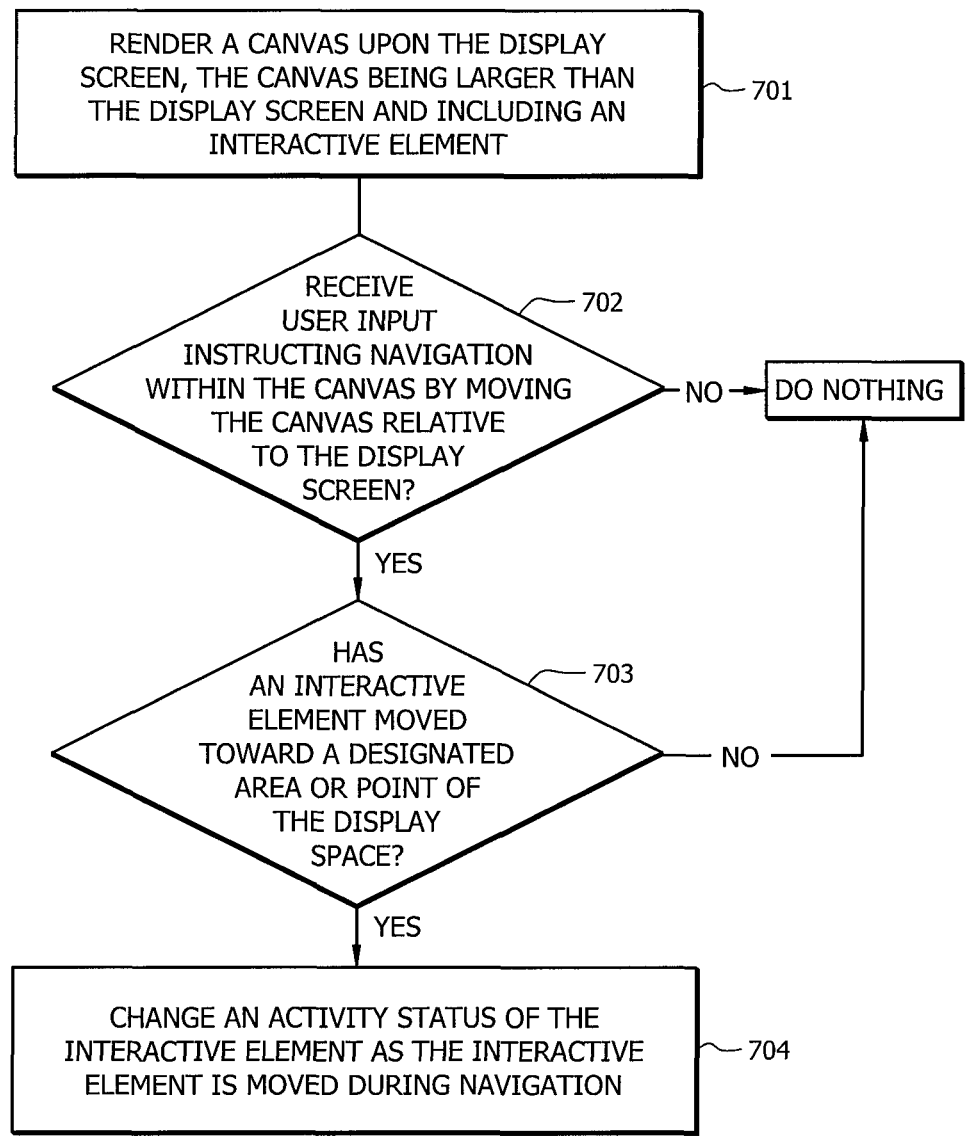
FIG. 7 is an illustration of an exemplary method adapted according to one embodiment of the invention.

Embodiments of the invention include methods that are performed by a processor-based device with a display screen. FIG. 7 is an illustration of exemplary method 700 adapted according to one embodiment of the invention.

In block 701, a canvas is rendered upon the display screen. In this example, the canvas is larger than the display screen, and it includes a set of interactive elements. Embodiments can employ any kind of interactive element now known or later developed, such as icons, tiles, control features, windows, and the like.

In block 702, user input is received to navigate within the canvas by moving the canvas relative to the display screen. User input can be received through any of a variety of hardware devices, such as a touchscreen, a keypad, a mouse or other pointing device, a microphone, and/or the like. In response to the input, the device changes a view of the canvas within the display space. In block 703, the navigation brings one or more interactive elements closer to the center of the display space and also moves one or more of the interactive elements away from the center of the display space.

In block 704, an activity status of at least one of the interactive elements is changed as an interactive element is moved during navigation. For instance, as shown above in FIGS. 2-5, interactive elements can become selectable as they move toward the center of a user's focus (e.g., a center of the display space). Various embodiments may make interactive elements selectable other than in the center of the display space. In some examples, an interactive element can become active when it is at or near the top of the screen or the bottom of the screen or even the sides or the corners of the screen.

Additionally or alternatively, other types of activity statuses can be changed, such as by launching an application, going to a link, activating a tile to show updated information, initiating background process such as downloading data, start a movie playing, and/or the like. Furthermore, visual transformations can be applied to the interactive elements to indicate that an activity status is changing or has changed. For instance, gradual fade in/out can be employed, as can resizing, zooming, color effects, rotation, and the like. In fact, any visual transformation now known or later developed can be adapted for use in some embodiments.

Various embodiments provide advantages over prior art techniques. For instance, user input is transformed into reactions within the canvas that provide an intuitive experience similar to walking around the canvas where the space responds to the walking. In some embodiments, activity and selectability are emphasized when they are in or near the user's focus. Such embodiments may provide an elegant way to indicate to a user which of the elements on a screen are interactable.

Various embodiments of the invention provide a system wherein the primary navigation mechanism smoothly slides back and forth and/or up and down, and the interactive elements respond directly to the sliding. Such embodiments may function to put the user very much in control and can feel like a more organic interaction than current techniques.

When implemented via computer-executable instructions, various elements of embodiments of the present invention are in essence the software code defining the operations of such various elements. The executable instructions or software code may be obtained from a tangible computer-readable medium (e.g., a hard drive media, optical media, EPROM, EEPROM, tape media, cartridge media, flash memory, ROM, memory stick, and/or the like). In fact, computer-readable media can include any medium that can store information.

Figure 8:
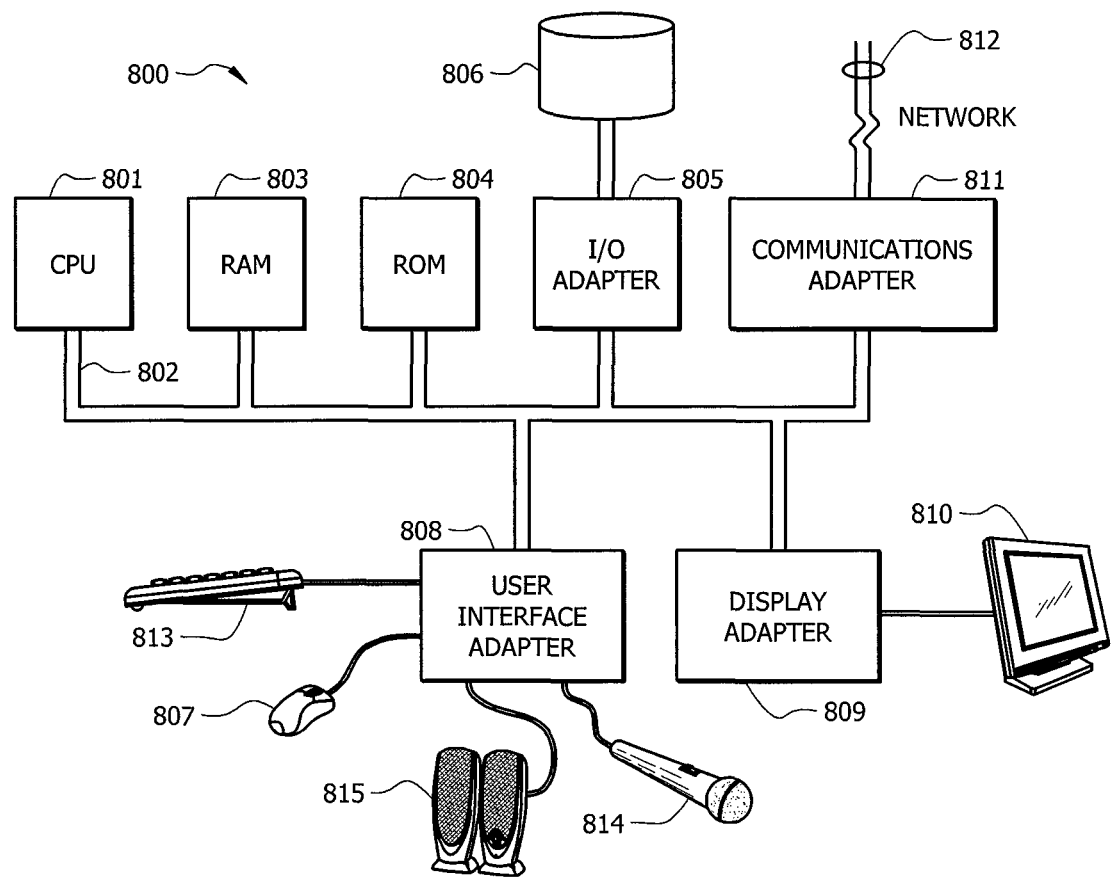
FIG. 8 illustrates an exemplary computer system adapted according to one embodiment of the present invention.

FIG. 8 illustrates an example computer system 800 adapted according to one embodiment of the present invention. That is, computer system 800 comprises an example system on which embodiments of the present invention may be implemented (such as a handheld device, a desktop/laptop computer, or computer controlling a wall-sized screen). Central processing unit (CPU) 801 is coupled to system bus 802. CPU 801 may be any general purpose CPU. The present invention is not restricted by the architecture of CPU 801 as long as CPU 801 supports the inventive operations as described herein. CPU 801 may execute the various logical instructions according to embodiments of the present invention. For example, CPU 801 may execute machine-level instructions according to the exemplary operational flow described above in conjunction with FIG. 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as receiving input from a touchscreen, keypad, mouse/touchpad/roller ball, displaying items on a screen, and the like.

I/O adapter 805 preferably connects to storage device(s) 806, such as one or more of hard drive, solid state disk (SSD) drive, compact disc (CD) drive, floppy disk drive, tape drive, etc. to computer system 800. The storage devices may be utilized when RAM 803 is insufficient for the memory requirements associated with storing data. Communications adapter 811 is preferably adapted to couple computer system 800 to network 812 (e.g., a local area network, the Internet, a cellular phone network, and/or the like). User interface adapter 808 couples user input devices, such as keyboard 813, pointing device 807, and microphone 814 and/or output devices, such as speaker(s) 815 to computer system 800.

Display adapter 809 is driven by CPU 801 to control the display on display device 190 to, for example, display the user interface of FIGS. 1-6, which may include touchscreen capability.

It shall be appreciated that the present invention is not limited to the architecture of system 800. For example, any suitable processor-based device may be utilized, including without limitation, personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product having a non-transitory computer readable medium having computer program logic recorded thereon, the computer program product comprising:
    code for generating a canvas upon a display space, the canvas being larger than the display space and comprising an interactive element; and
    code for changing a status of the interactive element in response to movement-of-the interactive element within the display space, wherein changing the status of the interactive element comprises:
        causing the interactive element to transition from invisible, to translucent, to opaque as the canvas shifts, and
        causing the interactive element to change from unselectable to selectable as the interactive element transitions from translucent to opaque.

2. The computer program product of claim 1 wherein the code for changing a status of the interactive element comprises:
    code for applying a visual transformation to the interactive element.

3. The computer program product of claim 2 wherein the visual transformation comprises a gradual change in appearance of the interactive element.

4. The computer program product of claim 2 wherein the visual transformation is applied as the interactive element approaches a center of the display space during navigation.

5. The computer program product of claim 2 wherein the visual transformation comprises at least one of the following:
    a gradual change in size of the interactive element; and
    a gradual rotation of the interactive element.

6. The computer program product of claim 1 wherein the display space comprises at least one of the following:
    a screen of a handheld device; and
    a screen of a desktop computer.

7. The computer program product of claim 1 wherein the code for changing a status of the interactive element comprises:
    code for making the interactive element selectable.

8. The computer program product of claim 1 wherein the code for code for changing a status of the interactive element comprises:
    code for selecting the interactive element.

9. The computer program product of claim 1 wherein the interactive element comprises an item selected from the list consisting of:
    an icon;
    a small collection of user interface components that work together;
    a window; and
    a single user interface component.

10. The computer program product of claim 1 wherein the canvas is three-dimensional.

11. The computer program product of claim 1 wherein the canvas includes a plurality of other interactive elements.

12. The computer program product of claim 1 further comprising:
    code for inserting the interactive element into the canvas in response to input; and
    code for expanding the canvas in response to inserting the interactive element.

13. The computer program product of claim 1 wherein during navigation the interactive element is visible but non-selectable within a first portion of the display space and visible and selectable within a second portion of the display space.

14. The computer program product of claim 1 wherein the canvas comprises:
    a virtual display area on which the interactive element is placed.

15. A method performed upon a processor-based device with a display screen, the method comprising:
    rendering a canvas upon the display screen, the canvas being larger than the display screen and including an interactive element;
    moving the canvas relative to the display screen; and
    changing an activity status of the interactive element as the interactive element is moved, wherein said changing activity status includes monitoring proximity of the interactive element with respect to the display screen and changing the activity status of the interactive element when a specified portion of the interactive element crosses a pre-defined proximity threshold, wherein changing the activity status of the interactive element comprises:
        transitioning the interactive element from invisible, to translucent, to opaque as the canvas moves, and
        changing the interactive element from unselectable to selectable as the interactive element transitions from translucent to opaque.

16. The method of claim 15 further comprising:
    changing a visual appearance of the interactive element as the activity status is changed.

17. The method of claim 15 wherein changing an activity status comprises one or more of:
    transforming from an icon to an active application; and
    transforming from a tile to an active application.

18. The method of claim 15 wherein the canvas is moved in response to user input received through input means of the processor-based device.

19. The method of claim 15 wherein the activity status of the interactive element is changed in response to the interactive element approaching an area of the display screen.

20. The method of claim 15 wherein, during navigation, the interactive element is on the display screen and is in a non-selectable state, the interactive element changing to a selectable state as it approaches a portion of the display screen.

21. A handheld, processor-based device comprising:
a screen having a display area, the screen displaying a canvas, the canvas being larger than the display area:
an interactive element on the canvas; and
wherein the processor is operable for dynamically causing the interactive element to change its executable status in response to its proximity to a first portion of the display area during movement of the canvas wherein changing the interactive element's executable status comprises transitioning the interactive element from invisible, to translucent, to opaque as the canvas shifts and changing the interactive element from unselectable to selectable as the interactive element transitions from translucent to opaque.

22. The handheld, processor-based device of claim 21 further comprising:
interface means for receiving input, wherein the processor transforms the received input into movement of the canvas relative to the display area.

23. The handheld, processor-based device of claim 21 wherein the interactive element is visible but not selectable within a second portion of the display area.

24. The handheld, processor-based device of claim 21, wherein the screen comprises a touchscreen.

25. A personal computer comprising:
a screen having a display area, the screen displaying a canvas, the canvas being larger than the display area and containing an interactive element:
interface means for receiving input, wherein the computer transforms the received input into movement of the canvas relative to the display area; and
wherein the computer is operable for changing a status of the interactive element during movement of the canvas in response to proximity of the interactive element to a designated portion of the display area wherein changing the status of the interactive element comprises transitioning the interactive element from invisible, to translucent, to opaque as the canvas shifts and changing the interactive element from unselectable to selectable as the interactive element transitions from translucent to opaque.

26. The personal computer of claim 25, wherein the screen comprises a touchscreen.

27. The personal computer of claim 25 wherein the interactive element is visible but not selectable within a second portion of the display area.

28. The personal computer of claim 25 wherein the interactive element comprises an item selected from the list consisting of:
an icon;
a tile;
a window; and
a control feature.

29. The personal computer of claim 28 wherein the tile comprises:
a small collection of control features that work together.

30. The personal computer of claim 28 wherein the control feature comprises:
a single User Interface (UI) component.

31. The personal computer of claim 25 wherein the canvas comprises:
a virtual display area on which the interactive element is placed, and less than the entirety of the canvas is displayed on the screen at a given time.

* * * * *